(12) United States Patent
Iwasaki et al.

(10) Patent No.: US 9,905,258 B2
(45) Date of Patent: Feb. 27, 2018

(54) MAGNETIC RECORDING MEDIUM AND MAGNETIC RECORDING AND REPRODUCTION DEVICE

(71) Applicant: Kabushiki Kaisha Toshiba, Minato-Ku, Tokyo (JP)

(72) Inventors: Takeshi Iwasaki, Inagi Tokyo (JP); Akira Fujimoto, Kawasaki Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 248 days.

(21) Appl. No.: 15/007,907

(22) Filed: Jan. 27, 2016

(65) Prior Publication Data

US 2017/0117010 A1   Apr. 27, 2017

(30) Foreign Application Priority Data

Oct. 22, 2015   (JP) .................................. 2015-207794

(51) Int. Cl.
| | |
|---|---|
| *G11B 5/66* | (2006.01) |
| *G11B 5/73* | (2006.01) |
| *G11B 5/667* | (2006.01) |
| *G11B 5/84* | (2006.01) |
| *G11B 5/851* | (2006.01) |

(52) U.S. Cl.
CPC .............. *G11B 5/732* (2013.01); *G11B 5/667* (2013.01); *G11B 5/7315* (2013.01); *G11B 5/7325* (2013.01); *G11B 5/8404* (2013.01); *G11B 5/8408* (2013.01); *G11B 5/851* (2013.01)

(58) Field of Classification Search
CPC ........ G11B 5/732; G11B 5/7325; G11B 5/738
See application file for complete search history.

(56) References Cited

U.S. PATENT DOCUMENTS

| | | |
|---|---|---|
| 7,670,689 B2 | 3/2010 | Camel et al. |
| 2007/0072012 A1 | 3/2007 | Nakamura et al. |
| 2015/0004436 A1 | 1/2015 | Iwasaki |

(Continued)

FOREIGN PATENT DOCUMENTS

| | | |
|---|---|---|
| JP | 2002-025030 A | 1/2002 |
| JP | 2013-125554 A | 6/2013 |

(Continued)

OTHER PUBLICATIONS

English mashine translation of JP 2013-125554, Japan, Jun. 24, 2013, pp. 1-17.*

*Primary Examiner* — Holly Rickman
(74) *Attorney, Agent, or Firm* — White & Case LLP (57) ABSTRACT

According to one embodiment, a magnetic recording medium with high magnetic recording characteristics and improved corrosion resistance is obtained. The magnetic recording medium includes a substrate, an orientation control layer provided on the substrate and made from a Ni alloy or an Ag alloy, a nonmagnetic seed layer provided to be in contact with the orientation control layer, a perpendicular magnetic recording layer containing Fe or Co and Pt as main components. The nonmagnetic seed layer is formed of Ag particles, Ge grain boundaries and a compound X, and the compound X is selected from an oxide, nitride or carbide of aluminum, titanium, chromium, silicon and tantalum and also distributed in both the Ag particles and Ge grain boundaries.

8 Claims, 2 Drawing Sheets

(56) References Cited

U.S. PATENT DOCUMENTS

2015/0162041 A1 6/2015 Iwasaki
2016/0035382 A1 2/2016 Iwasaki et al.

FOREIGN PATENT DOCUMENTS

| JP | 2014-155116 A | 8/2014 |
| JP | 2015-109633 A | 6/2015 |
| JP | 2016-031773 A | 3/2016 |

* cited by examiner

MAGNETIC RECORDING MEDIUM AND MAGNETIC RECORDING AND REPRODUCTION DEVICE

CROSS-REFERENCE TO RELATED APPLICATIONS

This application is based upon and claims the benefit of priority from Japanese Patent Application No. 2015-207794, filed Oct. 22, 2015, the entire contents of which are incorporated herein by reference.

FIELD

Embodiments described herein relate generally to a magnetic recording medium and a magnetic recording and reproduction device.

BACKGROUND

As a magnetic recording mode used in commercially available HDDs, the so-called perpendicular magnetic recording mode is the mainstream in recent years.

A granular-type recording layer has a granular structure in which the magnetic crystal grains are surrounded by grain boundary regions made of non-magnetic materials, and therein, the magnetic crystal grains are two-dimensionally and physically isolated from each other by the non-magnetic grain boundary region and such a structure achieves reduction in magnetic exchange interaction between the magnetic grains. Thus, transition noise in recording and reproduction characteristics can be reduced and a limit bit size can also be reduced also. Conversely, since the magnetic exchange interaction between the magnetic grains is reduced in the granular-type recording layer, the distribution of the inverse magnetic field tends to increase depending on the distribution of components and sizes of the grains and such a structure causes increase of the transition noise and jitter noise in the recording and reproduction characteristics.

Furthermore, the lower limit value of the recording bit size is set depending largely on the size of the magnetic crystal grains of the granular-type recording layer. Thus, to increase the recording density of the HDD, the grains in the granular-type recording layer must be fine. As a method for making the grains in the granular-type recording layer fine, a technique is known of using an underlayer having fine crystal grains to make the grains of the granular-type recording layer stacked thereon fine. Here, to make the grains of the underlayer fine, there are several possible methods such as manipulating the seed layer and making the underlayer granular.

DETAILED DESCRIPTION

Embodiments will now be described with reference to drawings.

Figure 1:
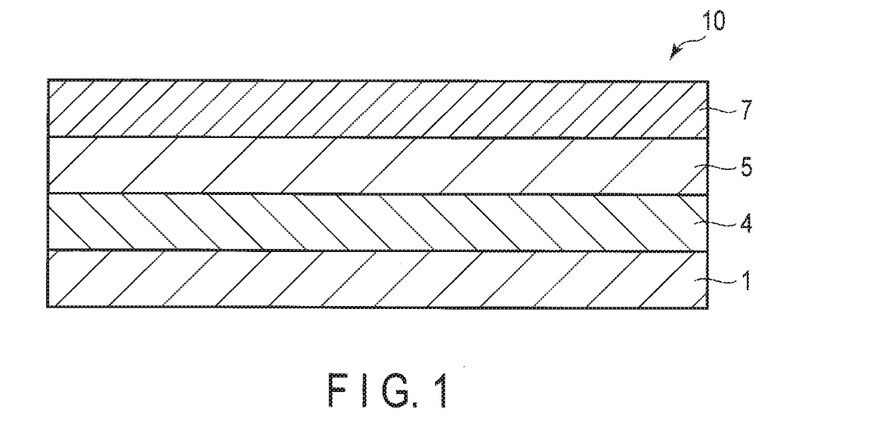
FIG. 1 is a cross sectional view showing an example of the structure of a magnetic recording medium according to an embodiment.

FIG. 1 is a cross sectional view of an example of the structure of the magnetic recording medium according to an embodiment.

As shown in FIG. 1, a magnetic recording medium 10 of this embodiment comprises a substrate 1, an orientation control layer 4 having fcc structure and formed from a Ni alloy or an Ag alloy, a non-magnetic seed layer 5 formed to be in contact with the orientation control layer 4 and a perpendicular magnetic recording layer 7 formed of FePt or CoPt as a main component.

The nonmagnetic seed layer comprises Ag particles, Ge grain boundaries and a compound X, and is expressed by the following formula:

$$AgGe\text{---}X \quad (1)$$

wherein the compound X is selected from an oxide, a nitride or a carbide of one of Al, Ti, Cr, Si, and Ta.

Figure 2:
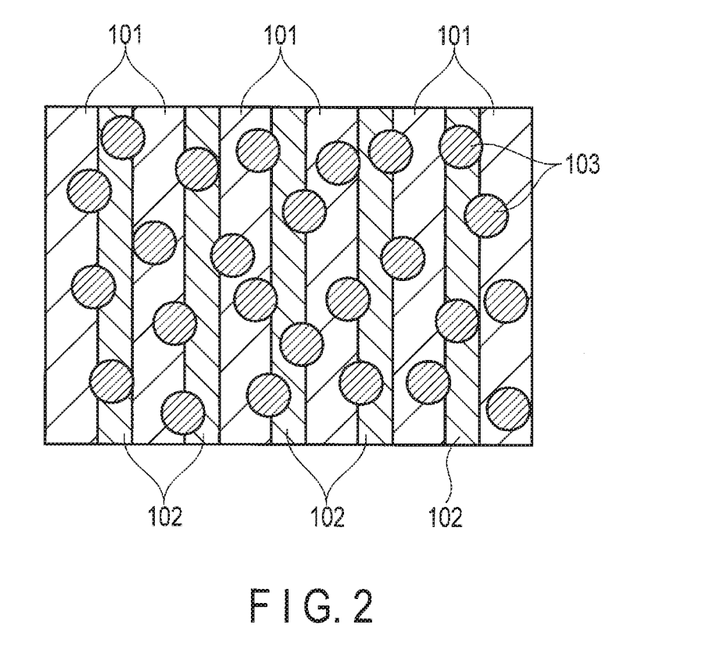
FIG. 2 is a schematic diagram showing a structure of a non-magnetic seed layer used in the embodiment.

FIG. 2 is a schematic diagram showing a structure of a non-magnetic seed layer used in a magnetic recording layer according to the embodiment.

As shown, the compounds X denoted by reference number 103 are distributed in both of Ge grain boundaries 101 and Ag particles 102.

Ag may have a columnar grain structure. Ge may have a grain boundary structure which encloses Ag columnar grains and the compound X may have a spherical structure with an average grain size of 1 to 5 nm.

Here, a spherical structure observed with a transmission electron microscope (TEM), a scanning transmission electron microscope (STEM) or the like to measure two or more lengths for one grain as follows, and an average thereof is defined as the average particle diameter. More specifically, of TEM or STEM images of magnification of one million to four million times, arbitrary images which have an estimated number of grains of at least ten are input to a computer as image data. Then, the image data is subjected to image processing to extract an outline of spherical structure of each particle. Next, a path which connects two points on the outer circumference of the spherical structure and passes along the center of gravity is measured every 20, and an average of these is measured to obtain an average particle diameter as the diameter of the spherical structure. Note that the compound X has an amorphous structure, and therefore it is likely to be unclear under usual TEM imaging. Therefore, an element discrete mapping observation such as type high-resolution energy dispersive X-ray spectroscopy (EDX) or high-angle-annular-dark-field scanning transmission electron microscopy (HAADF-STEM) or electron-energy-loss spectroscopy (EELS) may be used for easy evaluation.

In the magnetic recording medium of the embodiment, the grain pitch distribution of the non-magnetic seed layer can be improved by the Ag particles and the Ge grain boundaries, and the improved structure of the non-magnetic seed layer is continued to a the perpendicular magnetic recording layer, thus making it possible to improve the grain pitch of the perpendicular magnetic recording layer. Further, by distributing the compound X both the inside of Ag particles, and Ge grain boundaries, the deposit of Ag and Ge can be prevented and corrosion resistance can be improved.

Thus, according to the embodiment, a corrosion-resistant magnetic recording medium comprising a perpendicular magnetic recording layer having a small grain pitch distribution of magnetic particles can be provided.

The compound X can be selected from, for example, oxides of Al, Ti, Cr, Si and Ta. The amount of the compound X added to AgGe—X may be 2 mol % or more but 15 mol % or less.

As a substrate applicable to the embodiment, a glass substrate, Al alloy substrate, ceramic substrate, carbon substrate, and Si monocrystal substrate comprising an oxidation surface are available. The glass substrate may be an amorphous glass or a crystallization glass, for example. The amorphous glass may be a conventional soda lime glass or an aluminosilicate glass, for example. The crystallization glass may be a lithium crystallization glass, for example. The ceramic substrate may be a sintered material whose main component is conventional aluminum oxide, aluminum nitride and silicon nitride, or a fiber reinforced material of the same. As the substrate, the above-mentioned metal substrate or non-metal substrate on which a thin film such as a NiP layer and the like is formed by plating method or sputtering method may be used. Instead of sputtering method as the method of forming a thin film on a substrate, vacuum evaporation or electrolytic plating can be used to obtain the same effect.

An orientation control layer applicable to the embodiment is made of a Ni alloy or an Ag alloy having fcc structure.

A magnetic recording layer applicable to the embodiment contains FePt or CoPt as a main component.

Moreover, it is desirable to use a perpendicular magnetic recording layer having a magnetic anisotropy perpendicular to the substrate. When a perpendicular magnetic recording layer is used, the external magnetic field output from a recording dot may act in a direction which maintains the signal of the surrounding record dot when increasing the density. Therefore, signals do not easily disappear because of heat decay, and it tends to be easy to achieve high-density. The thickness of the magnetic recording layer may be, for example, 3 to 30 nm, or more preferably 5 to 15 nm. Within this range, it is possible to produce a magnetic recording and reproduction device more suitable for high recording density. If the thickness of the magnetic recording layer is less than 3 nm, the reproduction output tends to be excessively too and the noise component may become higher than the output. If the thickness of the magnetic recording layer exceeds 30 nm, the reproduction output tends to be excessively high to distort the waveform. The magnetic recording layer may be formed into a multilayered structure of two or more layers stacking one on another, in which case, the total of stacked layers may be set within the above-mentioned range. The coercive force of the magnetic recording layer may be set to 237000 A/m (3000 Oe) or more. If the coercive force is less than 237000 A/m (3000 Oe), the thermal decay resistance tends to be inferior. The perpendicular squareness ratio of the magnetic recording layer may be set to 0.8 or more. If the perpendicular squareness ratio is less than 0.8, the thermal decay resistance tends to be deteriorated.

In the granular-type recording layer using Co, the Pt content in the magnetic recording layer may be set in a range of 10 at % to 25 at %. From this range of the Pt content, a uniaxial crystal magnetic anisotropy constant (Ku) which is necessary for the magnetic recording layer can be obtained, crystal orientation of magnetic grains can be improved, and consequently, good thermal decay characteristics and good recording and reproduction characteristics for high-density recording can be achieved. If the Pt content is set above or below this range, sufficient Ku for the thermal decay characteristics for high-density recording tends to be unobtainable.

Between the non-magnetic substrate and the orientation control layer, an adhesive layer, soft magnetic underlayer (SUL), and non-magnetic underlayer may be additionally interposed sequentially from the non-magnetic substrate.

The adhesive layer is provided to increase the adhesion between the substrate and the layer thereupon. As materials for the adhesive layer, materials having an amorphous structure such as Ti, Ta, W, Cr, and Pt, alloy containing such materials, or oxide of or nitride of such materials can be used. The thickness of the adhesive layer may be set in a range of, for example, 5 to 30 nm. Below 5 nm, the adhesion is not sufficient and the film tends to be peeled off easily. Above 30 nm, the processing time becomes too long and throughput tends to be poor.

The SUL functions as a part of a magnetic head by passing a recording magnetic field from a single-magnetic pole head used to magnetize the perpendicular magnetic recording layer in a horizontal direction and returning the recording magnetic field to the magnetic head side. The SUL thus applies the steep and sufficient perpendicular magnetic field to the recording layer of the magnetic field and improves the recording and reproduction characteristics. As the soft magnetic underlayer, materials containing Co, Fe, or Ni may be used. Specifically, a Co alloy containing Co and at least one of Zr, Hf, Nb, Ta, Ti, and Y may be used. The Co alloy may contain 70 at % or more of Co. On such a Co alloy, an amorphous layer is easily formed when sputtering method is adopted for forming the film. In the amorphous soft magnetic material, there is no crystal magnetic anisotropy, crystal defect, or grain boundary. Therefore, the amorphous soft magnetic material can exert highly superior soft magnetism and reduce the medium noises. As the amorphous soft magnetic material, CoZr, CoZrNb, and CoZrTa alloys are available, for example. Other materials for the soft magnetic underlayer may be a CoFe alloy such as CoFe, and CoFeV, FeNi alloy such as FeNi, FeNiMo, FeNiCr, and FeNiSi, FeAl and FeSi alloy such as FeAl, FeAlSi, FeAlSiCr, FeAlSiTiRu, and FeAlO, FeTa alloy such as FeTa, FeTaC, and FeTaN, and FeZr alloy such as FeZrN. Furthermore, materials having microcrystal structure such as FeAlO, FeMgO, FeTaN, and FeZrN in which Fe is contained at 60 at % or more, or materials having a granular structure including fine crystal grains dispersed in a matrix may be used. The thickness of the soft magnetic underlayer may be set in a range of, for example, 10 to 100 nm. Below 10 nm, recording magnetic field from the recording head is not sufficiently taken in the soft magnetic underlayer and recording and reproduction efficiency tends to be suppressed. Above 100 nm, the processing time becomes too long and throughput tends to be poor. Furthermore, the soft magnetic underlayer can be divided into a plurality of layers for spike noise prevention and non-magnetic dividing layers of 0.5 to 1.5 nm are interposed therebetween for antiferromagnetic coupling. As the non-magnetic dividing layer, Ru, Ru alloy, Pd, Cu, and Pt are available, for example. Furthermore, exchange coupling can be established between the soft magnetic underlayer and a hard magnetic film such as CoCrPt, SmCo or FePt having in-plane anisotropy or a pin layer made of an antiferromagnetic material such as IrMn and PtMn. To control exchange coupling force, magnetic films of Co and the like or non-magnetic films of Pt and the like may be layered over and under the non-magnetic dividing layers.

A non-magnetic intermediate layer can be provided between the nonmagnetic seed layer and the magnetic recording layer.

The non-magnetic intermediate layer functions to isolate the magnetic grains of the magnetic recording layer formed thereon and to improve the crystallinity of the magnetic recording layer. The materials for the non-magnetic intermediate layer may be Ru or an alloy of Ru and at least one metal selected from the group consisting of Cr, Mo, Co, Mn, and Si. The thickness of the non-magnetic intermediate layer may be set in a range of, for example, 5 to 30 nm. Below 5 nm, the crystal orientation is not sufficient. Above 30 nm, the distance (spacing) between the magnetic head and the SUL is expanded. Writing to the magnetic recording layer becomes weak and the recording and reproduction characteristics tend to be poor.

A protective layer may be formed on the magnetic recording layer.

The protective layer applicable to the embodiment is for the purpose of preventing damage to the magnetic recording layer due to corrosion and damage to the medium surface due to collision of the magnetic head with the medium. A material for the protective layer may be a material including C. The thickness of the protective layer can be set in a range of 1 to 10 nm, for example. Within this range, the distance between the head and the medium can be shortened and thus, high-density recording is performable. Carbon used here may be classified as $sp^2$ coupling carbon (graphite) or $sp^3$ coupling carbon (diamond). $Sp^3$ coupling carbon is superior to graphite in both durability and corrosion resistance, but is inferior to graphite in surface smoothness because of its crystalline condition. In general, a carbon film is formed based on the sputtering method using the graphite target. Through this process, an amorphous carbon in which $sp^2$ coupling carbon and $sp^3$ coupling carbon are mixed is produced. The amorphous carbon in which $sp^3$ coupling carbon content is richer is called diamond-like carbon (DLC) which is excellent in durability and corrosion resistance, and is also excellent in surface smoothness because of its amorphous structure. Thus, DLC is used as a surface protective layer for a magnetic recording medium. In chemical-vapor deposition (CVD) method for producing DLC, excitation and decomposition of material gas are performed in plasma and DLC is generated by chemical reaction. Thus, if certain conditions are met, DLC with richer $sp^3$ coupling carbon content can be produced.

The magnetic recording and reproduction device of this embodiment comprises:

a substrate;

an orientation control layer provided on the substrate and formed of a Ni alloy or an Ag alloy;

a nonmagnetic seed layer provided to be in contact with the orientation control layer;

a magnetic recording medium comprising a perpendicular magnetic recording layer containing Fe or Co and Pt as main components; and a magnetic recording head, wherein the nonmagnetic seed layer is formed of Ag particles, Ge grain boundaries, and compound X, and the compound X is selected from an oxide, nitride or carbide of Al, Ti, Cr, Si and Ta and is distributed over both the Ag particles and Ge grain boundaries.

Figure 3:
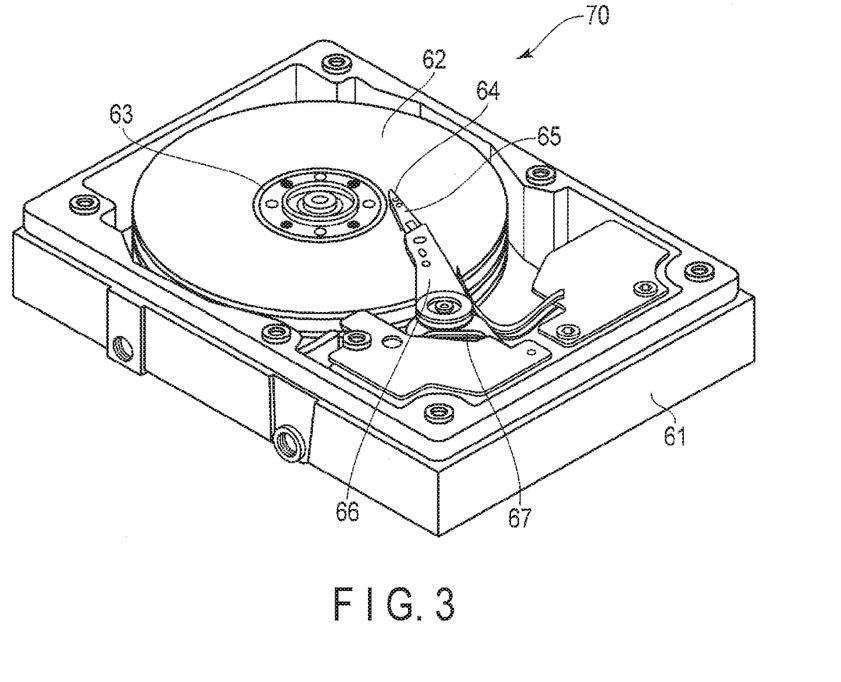
FIG. 3 is a partially exploded perspective view of an example of the magnetic recording and reproduction device according to an embodiment.

FIG. 3 is a partially exploded perspective view of an example of the magnetic recording and reproduction device according to an embodiment.

In a magnetic recording and reproduction apparatus 70 according to the embodiment, a rigid structure magnetic disk 62 for recording information, according to the embodiment, is installed in a spindle 63 and is rotated at a constant rotation rate by a spindle motor (not shown). A magnetic head configured to record and reproduce information by accessing the magnetic disk 62 is mounted on a slider 64 which is attached to a tip of a suspension 65 of a thin plate-shaped flat spring. The suspension 65 is connected to one end of an arm 66 including, for example, a bobbin supporting a drive coil (not shown).

A voice coil motor 67 which is a kind of a linear motor is disposed on the other end of the arm 66. The voice coil motor 67 includes a magnetic circuit in which a drive coil (not shown) wound around the bobbin of the arm 66 is sandwiched by a permanent magnet and an opposite yoke facing each other.

The arm 66 is supported by ball bearings (not shown) provided in locations, that is, over and under a fixing shaft and is rotated and slid by the voice coil motor 67. That is, the position of the slider 64 on the magnetic disk 62 is controlled by the voice coil motor 67.

EXAMPLES

Hereinafter, Examples will be provided to describe the embodiments more specifically.

Example 1 and Comparative Examples 1 to 4

Figure 4:
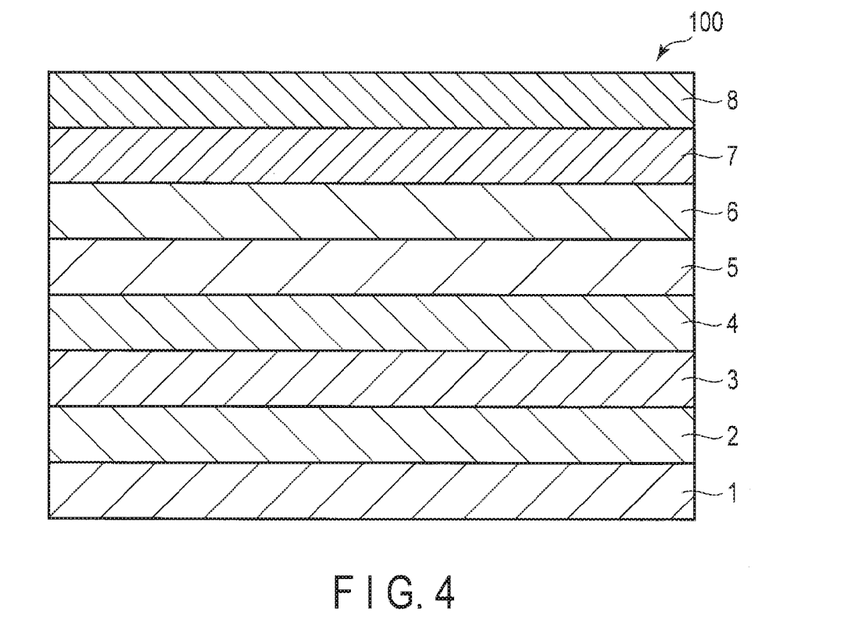
FIG. 4 is a cross sectional view showing another example of the structure of the magnetic recording medium according to the embodiment.

FIG. 4 is a cross sectional view showing the structure of a magnetic recording medium according to Example 1.

A non-magnetic glass substrate 1 (Konica Minolta, amorphous substrate MEL6, 2.5 inches in diameter) was placed in a film forming chamber of a DC magnetron sputtering apparatus (Canon-Anelva, C-3010), and air was exhausted from the chamber to the degree of vacuum of $1 \times 10^{-5}$ Pa. Then, gaseous Ar was introduced into the chamber in order to establish a gas pressure 0.7 Pa, and a Cr-25-at % Ti layer of thickness 10 nm was formed on the substrate 1 as an adhesive layer 2. Then, a Co-20-at % Fe-7-at % Ta-5-at % Zr layer of thickness 40 nm was formed as a soft magnetic layer 3. Then, Ni-5-at % W layer of thickness 5 nm was formed as an orientation control layer 4. Then, gaseous Ar was introduced into the film forming chamber in order to establish a gas pressure of 0.4 Pa, and (Ag-60 at % Ge)-5-mol % $Al_2O_3$ film of thickness 8 nm was formed as a non-magnetic seed layer 5. Then, gaseous Ar was introduced in the film forming chamber in order to establish a gas pressure of 0.7 Pa again, and an Ru layer of thickness 10 nm was formed as a non-magnetic intermediate layer 6. Furthermore, an Ru layer of thickness 10 nm was formed with gas pressure changed to 6 Pa, to obtain an Ru non-magnetic intermediate layer 6 of total thickness 20 nm. Then, a (Co-18-at % Pt-14-at % Cr)-10-mol % $SiO_2$ layer of thickness 12 nm was formed as a perpendicular magnetic recording layer 7. Then, a DLC protective layer 8 of thickness 2.5 nm was formed thereon using the CVD method. Then, a lubricating agent (not shown) was applied thereon by dipping method to acquire a perpendicular magnetic recording medium 100 according to the embodiment.

Then, a perpendicular magnetic recording medium according to Comparative Example 1 was manufactured in the same manner as was in the medium of Example 1 except that the non-magnetic seed layer 5 was omitted therefrom.

Further, a magnetic recording medium according to Comparative Example 2 was manufactured in the same manner as was the medium of Example 1 except that an AgGe film was formed instead of AgGe—$Al_2O_3$ as the nonmagnetic seed layer 5.

Still further, a perpendicular magnetic recording medium according to Comparative Example 3 was manufactured in the same manner as was the medium of Example 1 except that an AgGe—Al film was formed instead of AgGe—$Al_2O_3$ as the nonmagnetic seed layer 5.

Still further, a perpendicular magnetic recording medium according to Comparative Example 4 was manufactured in the same manner as was the medium of Example 1 except that an Ag—$Al_2O_3$ was formed instead of AgGe—$Al_2O_3$ as the nonmagnetic seed layer 5. The media thus obtained in Example 1 and Comparative Examples 1 to 4 were evaluated in terms of their properties as follows.

Firstly, the grain structures in a film plane direction and cross sectional direction were observed by TEM. Further, components of particles and grain boundaries were analyzed using an energy-dispersive X-ray spectroscope (TEM-EDX). Further, to investigate the average particle size of the compound ($Al_2O_3$) of the nonmagnetic seed layer, a high-resolution EDX mapping method was used to observe an element discrete image. Based on the results of measurements by planar TEM analysis, the particle size analysis and the pitch analyses of the particles were performed in the following manner. That is, from the planar TEM images taken at a magnification range between five hundred thousand and two million times, arbitrary images in which the number of grains was estimated at least 100 or more were input to a computer as image data. The image data was then subjected to image processing to extract an outline and center of gravity of each crystal grain. Next, a path which connects two points on the outer circumference of the spherical structure and passes along the center of gravity is measured every 2°, and an average of these is measured to obtain an average particle diameter as the diameter of the crystal grain. Further, from the distance between the centers of gravity of the adjacent grains, average pitch and grain pitch distribution between the grains were derived. Grain boundary widths on a line connecting the centers of gravity of the grains were measured, and an average value of the measured grain boundary widths was set as a grain boundary width. Furthermore, the average particle diameter of the compound, which has a spherical structure, of the nonmagnetic seed layer was calculated in the following manner using the spherical structures obtained by the EDX mapping method. That is, from mapping images of magnification of one million to four million times, arbitrary images which have an estimated number of grains of at least twenty are input to a computer as image data. Then, the image data is subjected to image processing to extract an outline of spherical structure of each particle. Next, a path which connects two points on the outer circumference of the spherical structure and passes along the center of gravity is measured every 2°, and an average of these is measured to obtain an average particle diameter as the diameter of the spherical structure. Then, each of these media was checked in term of crystal orientations ($\Delta\theta_{50}$) by measuring a rocking curve with an X-ray diffractometer (XRD, SPECTRIS, Xpert-MRD).

The results of the pitch analysis and crystalline evaluation of the medium of each of Example 1 and Comparative Examples 1 to 4 are shown in TABLE 1 below.

As for the orientation control layer of the medium of each of Example 1 and Comparative Examples 1 to 4, it was found that the NiW orientation control layer contains crystal grains of NiW, and crystal grains were in contact with each other, thus the grain boundary width being substantially 0. Here, the average particle diameter of NiW grains was about 9 nm, the average grain pitch was also about 9 nm, and the grain pitch distribution was about 21%. Further, each control layer was subjected to XRD measurement and electron beam diffraction analysis to estimate the crystal structure, and it was found that NiW had fcc structure.

The nonmagnetic seed layer of the medium of Example 1 was found to comprise crystalline Ag particles having an average particle diameter of about 6 nm and amorphous Ge grain boundaries having a boundary width of about 2 nm. Further, $Al_2O_3$ having a spherical structure with an average particle diameter of 1 to 3 nm was distributed over both in the Ag particles and the Ge grain boundaries.

As for the medium of Example 1, the nonmagnetic seed layer had a pitch distribution of the Ag particles of 12%, which was good.

The nonmagnetic seed layer of the medium of Comparative Example 2 was found to comprise crystalline Ag particles having an average particle diameter of about 6 nm and amorphous Ge grain boundaries having a boundary width of about 2 nm. Here, the nonmagnetic seed layer had a pitch distribution of the Ag particles of 16%, which was relatively good.

The nonmagnetic seed layer of the medium of Comparative Example 3 was found to comprise crystalline Ag—Al particles having an average particle diameter of about 6 nm and amorphous Ge grain boundaries having a boundary width of about 2 nm. Here, the nonmagnetic seed layer had a pitch distribution of the Ag—Al particles of 14%, which was good.

The nonmagnetic seed layer of the medium of Comparative Example 4 was found to have a granular structure comprising crystalline Ag particles having an average particle diameter of about 4 nm and amorphous $Al_2O_3$ grain boundaries having a boundary width of about 1 nm. Here, the grain pitch distribution was about 22%. From the above, the followings were found. That is, the nonmagnetic seed layer Ag—$Al_2O_3$ film of the medium of Comparative Example 4 was similar to that of the medium of each of Example 1, Comparative Examples 2 and 3 in that it had a granular structure, in which Ag particles are surrounded by amorphous grain boundaries. But unlike the medium of Example 1, Comparative Example 2 or 3, it lacks a mechanism which essentially improves the grain pitch distribution, and therefore the grain pitch distribution was significantly degraded.

Subsequently, as for the perpendicular magnetic recording layer of the medium of each of Example 1 and Comparative Examples 1 to 4, it was found that the particles are made of crystalline CoCrPt and the grain boundaries are made of amorphous $SiO_2$. In the medium of Example 1, $\Delta\theta_{50}$ of the perpendicular magnetic recording layer was about 30, the average grain pitch was about 8 nm, and that grain pitch distribution was as good as 12%.

As for the medium of Comparative Example 1, it was found that $\Delta\theta_{50}$ of the perpendicular magnetic recording layer was as good as about 2.50, whereas the grain pitch distribution deteriorated to 22%, lower than that of Example 1. As for the medium of each of Comparative Example 2 and 3, it was found that $\Delta\theta_{50}$ of the perpendicular magnetic recording layer was as good as about 2.5 to 2.7°, the average grain pitch was about 8 nm and the grain pitch distribution was as good as 14 to 16%. As to the medium of Comparative Example 4, it was found that $\Delta\theta_{50}$ of the perpendicular magnetic recording layer deteriorated to about 60, and further the grain pitch distribution deteriorated to about 23%, lower than that of Example 1.

Next, the media of Example 1 and Comparative Examples 1 to 4 were subjected to corrosion resistance test. The corrosion resistance test was performed in a thermohygrostat tub under conditions of a temperature of 85° C. and humidity of 90%, being let stand for 240 hours. The corrosion count after being let stand was performed by counting deposits using an optical surface analyzer (OSA, KLA Tencor, Candela TS2100). According to the results, the corrosion count of the medium of Example 1 was 15 with respect to the standard value being 100. The medium of Comparative Example 1 showed a count of as good as around 20 instances. The media of Comparative Example 2 counted 125 instances, exceeding the standard value. The medium of Comparative Example 3 counted 86 instances, which is below the standard value, but slightly degraded as compared to that of Embodiment 1. The count of the medium of Comparative Example 4 was 250, sharply deteriorated as compared to that of Example 1.

To summarize, it was found that the medium of Example 1 exhibited the best characteristics in crystal orientation, grain pitch distribution and corrosion resistance. The medium of Comparative Example 1 exhibited good crystal orientation and high corrosion resistance, but a degraded grain pitch distribution. The medium of Comparative Example 2 exhibited good crystal orientation and good grain pitch distribution, but a degraded corrosion resistance. The medium of Comparative Example 3 exhibited good crystal orientation and good grain pitch distribution, but a degraded corrosion resistance as compared to that of Example 1. The medium of the comparative example 4 exhibited degraded characteristics in crystal orientation, grain pitch distribution, and corrosion resistance.

TABLE 1

| | | Perpendicular magnetic recording layer | | |
|---|---|---|---|---|
| Nonmagnetic seed layer | $\Delta\theta 50$ (deg) | Average grain pitch (nm) | Grain pitch distribution (%) | Deposit count (instances) |
| Example 1 | AgGe—$Al_2O_3$ | 3 | 8 | 12 | 15 |
| Comparative Example 1 | — | 2.5 | 9 | 22 | 23 |
| Comparative Example 2 | AgGe | 2.5 | 8 | 16 | 125 |
| Comparative Example 3 | AgGe—Al | 2.7 | 8 | 14 | 86 |
| Comparative Example 4 | Ag—$Al_2O_3$ | 6 | 6 | 23 | 253 |

The structure of the magnetic recording medium obtained in each of Example 1 and Comparative Examples 1 to 4 is shown below.

Structure of Example 1

Non-magnetic glass substrate 1/CrTi adhesive layer 2/CoFeTaZr soft magnetic layer 3/NiW orientation control layer 4/AgGe—$Al_2O_3$ non-magnetic seed layer 5/Ru non-magnetic interlayer 6/CoCrPt—$SiO_2$ perpendicular magnetic recording layer 7/C protective layer 8

Structure of Comparative Example 1

Non-magnetic glass substrate 1/CrTi adhesive layer 2/CoFeTaZr soft magnetic layer 3/NiW orientation control layer 4/Ru non-magnetic interlayer 6/CoCrPt—$SiO_2$ perpendicular magnetic recording layer 7/C protective layer 8

Structure of Comparative Example 2

Non-magnetic glass substrate 1/CrTi adhesive layer 2/CoFeTaZr soft magnetic layer 3/NiW orientation control layer 4/AgGe non-magnetic seed layer/Ru non-magnetic interlayer 6/CoCrPt—$SiO_2$ perpendicular magnetic recording layer 7/C protective layer 8

Structure of Comparative Example 3

Non-magnetic glass substrate 1/CrTi adhesive layer 2/CoFeTaZr soft magnetic layer 3/NiW orientation control layer 4/AgGe—Al non-magnetic seed layer/Ru nonmagnetic interlayer 6/CoCrPt—$SiO_2$ perpendicular magnetic recording layer 7/C protective layer 8

Structure of Comparative Example 4

Non-magnetic glass substrate 1/CrTi adhesive layer 2/CoFeTaZr soft magnetic layer 3/NiW orientation control layer 4/Ag-5 mol % $Al_2O_3$ non-magnetic seed layer/Ru non-magnetic interlayer 6/CoCrPt—$SiO_2$ perpendicular magnetic recording layer 7/C protective layer 8

Examples 2 to 5

Perpendicular magnetic recording media according to Examples 2 to 5 were manufactured in the same manner as was the medium of Example 1 except that the material shown in Table 2 was used for the non-magnetic seed layer instead of AgGe—$Al_2O_3$.

The non-magnetic seed layer 5 of each of the media was subjected to TEM analysis, TEM-EDX analysis and EDX mapping analysis. In the non-magnetic seed layer 5 of the medium of each of Examples 2 to 5, it was found that the film was made of crystalline Ag particles whose average grain size was about 6 nm and amorphous Ge grain boundaries whose grain boundary width was about 2 nm. Further, it was also found that oxide particles having a spherical structure with an average particle diameter of 1 to 3 nm were distributed over both the Ag particles and Ge grain boundaries.

These media were examined in terms of crystal orientation, average grain pitch, grain pitch distribution and deposit count as in Example 1. As indicated in TABLE 2, as for the media of Examples 2 to 5, the grain pitch distribution of the perpendicular magnetic recording layer 7 was as good as 15 to 18%. The media of Examples 2 to 5 had good characteristics in crystal orientation, grain pitch distribution and corrosion resistance as in the case of the medium of Example 1.

TABLE 2

| | Perpendicular magnetic recording layer | | | |
|---|---|---|---|---|
| Nonmagnetic seed layer | $\Delta\theta 50$ (deg) | Average grain pitch (nm) | Grain pitch distribution (%) | Deposit count (instances) |
| Example 2 AgGe—$TiO_2$ | 3 | 8 | 15 | 23 |
| Example 3 AgGe—$Cr_2O_3$ | 3 | 8 | 16 | 25 |
| Example 4 AgGe—$SiO_2$ | 3 | 8 | 18 | 32 |
| Example 5 AgGe—$Ta_2O_5$ | 3 | 8 | 17 | 21 |

The structures of Examples 2 to 5 are as follows.

Structures of Examples 2 to 5

Non-magnetic glass substrate 1/CrTi adhesive layer 2/CoFeTaZr soft magnetic layer 3/NiW orientation control layer 4/AgGe—X (X=$TiO_2$, $Cr_2O_3$, $SiO_2$ and $Ta_2O_5$) nonmagnetic seed layer 5/Ru non-magnetic interlayer 6/Co-CrPt—SiO$_2$ perpendicular magnetic recording layer 7/C protective layer 8

Examples 6 to 15

Perpendicular magnetic recording media according to Examples 6 to 15 were manufactured in the same manner as was the medium of Example 1 except that the material shown in Table 3 was used for the non-magnetic seed layer 5 instead of AgGe—Al$_2$O$_3$.

The non-magnetic seed layer 5 of each of the media was subjected to TEM analysis, TEM-EDX analysis and EDX mapping analysis. In the non-magnetic seed layer 5 of the medium of each of Examples 6 to 15, it was found that the film was made of crystalline Ag particles whose average grain size was about 6 nm and amorphous Ge grain boundaries whose grain boundary width was about 2 nm. Further, it was also found that nitride particles having a spherical structure with an average particle diameter of 2 to 4 nm or carbide particles having a spherical structure with an average particle diameter of 3 to 5 nm were distributed over both the Ag particles and Ge grain boundaries.

These media were examined in terms of crystal orientation, average grain pitch, grain pitch distribution and deposit count as in Example 1. As indicated in TABLE 3, as for the media of Examples 6 to 15, the grain pitch distribution of the perpendicular magnetic recording layer 7 was as good as 18%. The media of Examples 6 to 15 had good characteristics in crystal orientation, grain pitch distribution and corrosion resistance as in the case of the medium of Example 1.

TABLE 3

| | | | Perpendicular magnetic recording layer | | |
|---|---|---|---|---|---|
| | Nonmagnetic seed layer | Δθ50 (deg) | Average grain pitch (nm) | Grain pitch distribution (%) | Deposit count (instances) |
| Example 6 | AgGe—AlN | 3.5 | 7 | 17 | 22 |
| Example 7 | AgGe—TiN | 3.5 | 7 | 17 | 23 |
| Example 8 | AgGe—Cr$_2$N | 3.5 | 7 | 15 | 25 |
| Example 9 | AgGe—Si$_3$N$_4$ | 3.5 | 7 | 17 | 28 |
| Example 10 | AgGe—TaN | 3.5 | 7 | 16 | 22 |
| Example 11 | AgGe—Al$_4$C$_3$ | 3.8 | 7 | 18 | 29 |
| Example 12 | AgGe—TiC | 3.8 | 7 | 16 | 27 |
| Example 13 | AgGe—Cr$_3$C$_2$ | 3.8 | 7 | 18 | 26 |
| Example 14 | AgGe—SiC | 3.8 | 7 | 17 | 25 |
| Example 15 | AgGe—TaC | 3.8 | 7 | 16 | 25 |

The structure of Examples 6 to 15 is as follows.

Structure of Examples 6 to 15

Non-magnetic glass substrate 1/CrTi adhesive layer 2/CoFeTaZr soft magnetic layer 3/NiW orientation control layer 4/Non-magnetic seed layer 5 of AgGe—Al, nitride or carbide of Ti, Cr, Si and Ta/Ru nonmagnetic interlayer 6/CoCrPt—SiO$_2$ perpendicular magnetic recording layer 7/C protective layer 8

Examples 16 to 20 and Comparative Examples 5 to 11

Perpendicular magnetic recording media according to Examples 16 to 20 to Comparative Examples 5 to 11 were manufactured in the same manner as was the medium of Example 1 except that the media of Examples 16 to 20 to Comparative Examples 5 to 11 were used for the non-magnetic seed layer 5 and the amount of Al$_2$O$_3$ added in AgGe—Al$_2$O$_3$ was varied from 0 to 30 mol %.

The non-magnetic seed layer 5 of each of the media was subjected to TEM analysis, TEM-EDX analysis and EDX mapping analysis. In the non-magnetic seed layer 5 of the medium of each of Example 1 and Examples 16 to 20, it was found that the film was made of crystalline Ag particles whose average grain diameter was about 6 nm and amorphous Ge grain boundaries whose grain boundary width was about 2 nm. Further, it was also found that Al$_2$O$_3$ particles having a spherical structure with an average particle diameter of about 6 nm were distributed over both the Ag particles and Ge grain boundaries. As for the medium of Comparative Example 5, it was found that the film was made of crystalline Ag particles whose average grain diameter was about 6 nm and amorphous Ge grain boundaries whose grain boundary width was about 2 nm. Further, it was also found that Al$_2$O$_3$ particles having a spherical structure with an average particle diameter of about 0.5 nm were distributed over both the Ag particles and Ge grain boundaries. As for the media of Comparative Examples 6 and 7, it was found that crystalline Ag particles whose average grain diameter was about 6 nm, amorphous Ge grain boundaries whose grain boundary width was about 2 nm and Al$_2$O$_3$ particles having a spherical structure with an average particle diameter of about 1 to 3 nm were distributed over both the Ag particles and Ge grain boundaries as in the case of Example 1. However, it was also found that an excessively large number of Al$_2$O$_3$ particles were present for the columnar structure of Ag particles to nearly collapse. As for the media of Comparative Examples 8 to 11, it was found that, because of an excessive amount of Al$_2$O$_3$ added, the structures of the Ag particles and Ge grain boundaries collapsed, and thus an amorphous structure of Ag and Ge was made, in which Al$_2$O$_3$ particles having a spherical structure with an average particle diameter of 1 to 3 nm were distributed.

These media were examined in terms of crystal orientation, average grain pitch, grain pitch distribution and deposit count as in Example 1. As indicated in TABLE 4, as for the media of Examples 2 and 5, which had a small amount of Al$_2$O$_3$ added, it was found that, because of a small amount of additives, the deposit count was 100 instances or more, which indicated that the corrosion resistance could not be improved. As for the media of Examples 16, 1 and 17 to 20, it was found that with the addition of Al$_2$O$_3$, the deposit was inhibited by a barrier, making it possible to improve the corrosion resistance. As for the media of Examples 6 and 7, it was found that with a large amount of additives, the crystallinity and grain pitch distribution started to deteriorate. As for the media of Comparative Examples 8 to 11, it was found that with an excessively large amount of additives, the structures of the Ag particles and Ge grain boundaries collapsed and the crystallinity and grain pitch distribution deteriorated greatly.

TABLE 4

| | | Perpendicular magnetic recording layer | | | |
|---|---|---|---|---|---|
| | Amount of Al$_2$O$_3$ added (mol %) | Δθ50 (deg) | Average grain pitch (nm) | Grain pitch distribution (%) | Deposit count (instances) |
| Example 16 | 2 | 2.8 | 8 | 13 | 53 |
| Example 1 | 5 | 3 | 8 | 12 | 15 |

TABLE 4-continued

| | Perpendicular magnetic recording layer | | | |
|---|---|---|---|---|
| | Amount of Al$_2$O$_3$ added (mol %) | Δθ50 (deg) | Average grain pitch (nm) | Grain pitch distribution (%) | Deposit count (instances) |
| Example 17 | 7 | 3.2 | 8 | 13 | 12 |
| Example 18 | 10 | 3.5 | 8 | 13 | 10 |
| Example 19 | 12 | 3.8 | 8 | 13 | 10 |
| Example 20 | 15 | 3.9 | 8 | 13 | 10 |
| Comparative Example 2 | 0 | 2.5 | 8 | 16 | 125 |
| Comparative Example 5 | 1 | 2.7 | 8 | 15 | 118 |
| Comparative Example 6 | 17 | 6 | 8 | 20 | 15 |
| Comparative Example 7 | 20 | 8 | 8 | 22 | 18 |
| Comparative Example 8 | 22 | 15 | 9 | 23 | 38 |
| Comparative Example 9 | 25 | 15 | 9 | 23 | 37 |
| Comparative Example 10 | 27 | 15 | 9 | 23 | 39 |
| Comparative Example 11 | 30 | 15 | 9 | 23 | 36 |

The structure of Examples 16 to 20 and Comparative Examples 5 to 11 is as follows.

The Structure of Examples 16 to 20 and Comparative Examples 5 to 11

Non-magnetic glass substrate 1/CrTi adhesive layer 2/CoFeTaZr soft magnetic layer 3/NiW orientation control layer 4/AgGe-x-mol % Al$_2$O$_3$ non-magnetic seed layer 5 (x=0 to 30)/Ru non-magnetic interlayer 6/CoCrPt—SiO$_2$ perpendicular magnetic recording layer 7/C protective layer 8

Examples 21 to 23 and Comparative Examples 12 and 13

Perpendicular magnetic recording media according to Examples 21 to 23 were manufactured in the same manner as was the medium of Example 1 except that the material shown in Table 5 below was used for the orientation control layer instead of NiW. A perpendicular magnetic recording media according to Example 12 was manufactured in the same manner as was the medium of Example 1 except that no film was formed as the orientation control layer 4 instead of NiW. A perpendicular magnetic recording media according to Example 13 was manufactured in the same manner as in the medium of Example 1 except that an amorphous NiTa layer was formed as the orientation control layer 4 instead of NiW.

The orientation control layer 4 of each medium was subjected to XRD analysis, TEM analysis and electron diffraction analysis. The results indicated that the orientation control layer 4 of the medium of each of Examples 21 to 23 had fcc structure. It was found that the orientation control layer 4 of the medium of Comparative Example 13 was amorphous. These media were examined in terms of crystal orientation, average grain pitch, grain pitch distribution and deposit count as in Example 1. As indicated in TABLE 5, as for the media of Examples 21 to 23, it was found that 8950 of the perpendicular magnetic recording layer 7 was good as about 3°. In contrast, as for the medium of each of Comparative Example 12 and 13, it was found that Δθ$_{50}$ of the perpendicular magnetic recording layer 7 deteriorated to 130 and 6°, respectively. Further, the medium of each of Examples 21 to 23 had good characteristics in crystal orientation, grain pitch distribution and corrosion resistance as in the case of the medium of Example 1.

TABLE 5

| | Perpendicular magnetic recording layer | | | |
|---|---|---|---|---|---|
| | Orientation control layer (crystal structure) | Δθ50 (deg) | Average grain pitch (nm) | Grain pitch distribution (%) | Deposit count (instances) |
| Example 1 | NiW (fcc) | 3 | 8 | 12 | 15 |
| Example 21 | NiCr (fcc) | 3 | 7.5 | 16 | 16 |
| Example 22 | AgPd (fcc) | 3 | 8 | 12 | 15 |
| Example 23 | AgAl (fcc) | 3 | 7.7 | 14 | 16 |
| Comparative Example 12 | — | 13 | 9 | 23 | 25 |
| Comparative Example 13 | NiTa (amorphous) | 6 | 9 | 23 | 25 |

The structure of Examples 21 to 23 and Comparative Examples 12 and 13 is as follows.

Structure of Examples 21 to 23

Non-magnetic glass substrate 1/CrTi adhesive layer 2/CoFeTaZr soft magnetic layer 3/Ni alloy or Ag alloy orientation control layer 4/AgGe—Al$_2$O$_3$ non-magnetic seed layer 5/Ru non-magnetic interlayer 6/CoCrPt—SiO$_2$ perpendicular magnetic recording layer 7/C protective layer 8

Structure of Comparative Example 12

Non-magnetic glass substrate 1/CrTi adhesive layer 2/CoFeTaZr soft magnetic layer 3/AgGe—Al$_2$O$_3$ non-magnetic seed layer 5/Ru non-magnetic interlayer 6/CoCrPt—SiO$_2$ perpendicular magnetic recording layer 7/C protective layer 8

Structure of Comparative Example 13

Non-magnetic glass substrate 1/CrTi adhesive layer 2/CoFeTaZr soft magnetic layer 3/Ni-alloy (amorphous) orientation control layer 4/AgGe—Al$_2$O$_3$ non-magnetic seed layer 5/Ru nonmagnetic interlayer 6/CoCrPt—SiO$_2$ perpendicular magnetic recording layer 7/C protective layer 8

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:
1. A magnetic recording medium comprising:
   a substrate;
   an orientation control layer provided on the substrate and made from a nickel alloy or a silver alloy;
   a nonmagnetic seed layer provided to be in contact with the orientation control layer;

a perpendicular magnetic recording layer containing iron or cobalt and platinum as main components, the nonmagnetic seed layer being formed of silver particles, germanium grain boundaries and a compound X, and the compound X being selected from the group consisting of an oxide, nitride or carbide of aluminum, titanium, chromium, silicon and tantalum and also distributed in both the Ag particles and Ge grain boundaries.

2. The magnetic recording medium of claim 1, wherein the compound X has a spherical structure with an average particle diameter of 1 to 5 nm.

3. The magnetic recording medium of claim 1, wherein the compound X is selected from the group consisting of an oxide of aluminum, titanium, chromium, silicon and tantalum.

4. The magnetic recording medium of claim 1, wherein an amount of compound X added is 2 mol % to 15 mol %.

5. A magnetic recording and reproduction device comprising:

a substrate;

an orientation control layer provided on the substrate and made from a nickel alloy or a silver alloy;

a nonmagnetic seed layer provided to be in contact with the orientation control layer;

a magnetic recording medium comprising a perpendicular magnetic recording layer containing iron or cobalt and platinum as main components; and a magnetic recording head, wherein the nonmagnetic seed layer is formed of silver particles, germanium grain boundaries and a compound X, and the compound X is selected from the group consisting of an oxide, nitride or carbide of aluminum, titanium, chromium, silicon and tantalum and is distributed in both the Ag particles and Ge grain boundaries.

6. The magnetic recording and reproduction device of claim 5, wherein the compound X has a spherical structure which has an average particle diameter of 1 to 5 nm.

7. The magnetic recording and reproduction device of claim 5, wherein the compound X is selected from the group consisting of an oxide of aluminum, titanium, chromium, silicon and tantalum.

8. The magnetic recording and reproduction device of claim 5, wherein an amount of the compound X added is 2 mol % to 15 mol %.

* * * * *